United States Patent
Beagley et al.

(10) Patent No.: US 12,387,448 B2
(45) Date of Patent: Aug. 12, 2025

(54) EMPTY SPACE MATRIX CONDENSATION

(71) Applicant: Microsoft Technology Licensing, LLC, Redmond, WA (US)

(72) Inventors: Madeleine Rosa Beagley, Vancouver (CA); Juan Bernardo Tamez Pena, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 18/079,152

(22) Filed: Dec. 12, 2022

(65) Prior Publication Data

US 2024/0193884 A1 Jun. 13, 2024

(51) Int. Cl.
*G06T 19/20* (2011.01)
*G06F 3/04817* (2022.01)

(52) U.S. Cl.
CPC .......... *G06T 19/20* (2013.01); *G06F 3/04817* (2013.01); *G06T 2200/24* (2013.01); *G06T 2219/2004* (2013.01); *G06T 2219/2016* (2013.01)

(58) Field of Classification Search
CPC ................. G06T 19/20; G06T 2200/24; G06T 2219/2004; G06T 2219/2016; G06F 3/04817
See application file for complete search history.

(56) References Cited

U.S. PATENT DOCUMENTS

| | | | |
|---|---|---|---|
| 3,488,106 A * | 1/1970 | Lohmann | G02B 27/46 708/821 |
| 6,968,511 B1 * | 11/2005 | Robertson | G06F 3/048 715/848 |
| 2004/0150664 A1 * | 8/2004 | Baudisch | G06F 3/04883 715/740 |
| 2012/0254573 A1 * | 10/2012 | Jacob | G06T 1/60 711/E12.001 |
| 2017/0091928 A1 * | 3/2017 | Von Berg | A61B 6/5205 |
| 2022/0091722 A1 * | 3/2022 | Faulkner | G06F 3/04815 |
| 2022/0270509 A1 * | 8/2022 | Josephson | G09B 19/003 |

FOREIGN PATENT DOCUMENTS

| | | | | |
|---|---|---|---|---|
| CN | 109697002 B | * | 7/2021 | G06F 3/011 |
| CN | 109003028 B | * | 5/2022 | G06Q 10/083 |

OTHER PUBLICATIONS

Fan et al., a machine translated English version of a foreign patent application (CN 109003028 B). (Year: 2022).*
Zhang, a machine translated English version of a foreign patent application (CN 109697002 B). (Year: 2021).*

* cited by examiner

*Primary Examiner* — Kee M Tung
*Assistant Examiner* — Biao Chen
(74) *Attorney, Agent, or Firm* — Schwegman Lundberg & Woessner, P.A.

(57) ABSTRACT

A computer implemented method includes obtaining a grid cell size for multiple clusters of objects in a display space. The objects are mapped to cells in the grid having the grid cell size. A grid compression threshold value expressed as a number of cells is used to condense the grid by removing cells based on the grid compression threshold value. The objects are remapped in the display space such that space between clusters of objects is reduced while maintaining relative positioning of objects within the clusters.

20 Claims, 8 Drawing Sheets

EMPTY SPACE MATRIX CONDENSATION

BACKGROUND

Clusters of points can be far apart. The distance between clusters can make it difficult to represent in the clusters within a constrained viewing space while preserving the ability to discern the points within clusters. Simply scaling the representation of the points to the constrained viewing space by zooming out in order to observe all the clusters within the viewing space can result in the points within clusters being compacted and difficult to discern.

SUMMARY

A computer implemented method includes obtaining a grid cell size for multiple clusters of objects in a display space. The objects are mapped to cells in the grid having the grid cell size. A grid compression threshold value expressed as a number of cells is used to condense the grid by removing cells based on the grid compression threshold value. The objects are remapped in the display space such that space between clusters of objects is reduced while maintaining relative positioning of objects within the clusters.

DETAILED DESCRIPTION

Figure 1A:
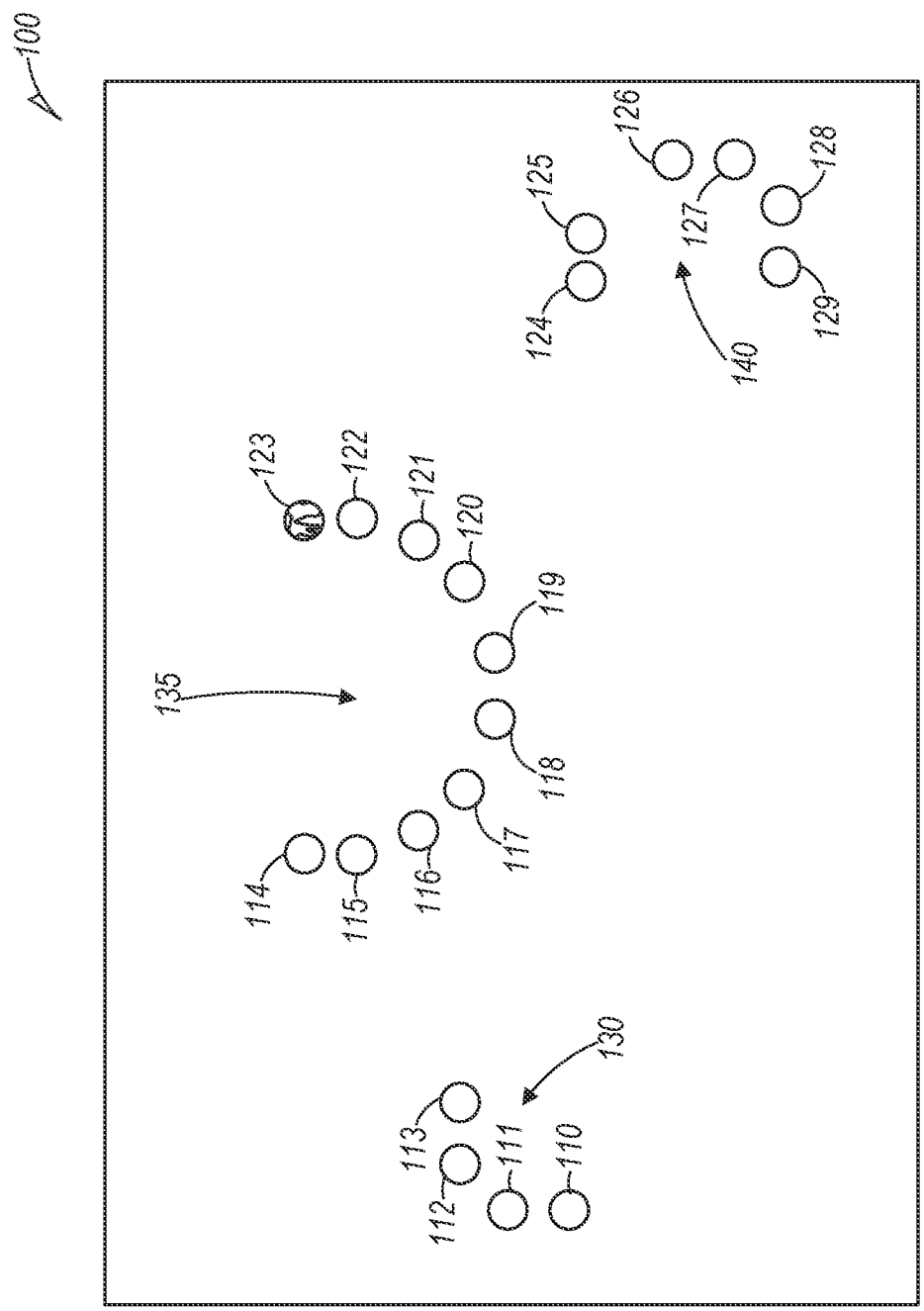
FIG. 1A is an example representation of a matrix to be condensed according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Prior methods of compressing representations of clusters of points while still fitting all the clusters onto a smaller range of coordinates of a map resulted in positions of points being very scaled down in order to fit within the coordinates of the map, making individual points more difficult to discern.

An improved method of matrix compression is performed to reduce an amount of empty space between clusters of points while maintaining relative positioning within clusters. The method may be performed in an extensible and customizable way.

The improved matrix compression method may be used to map relative coordinates of points onto a map. Various clusters of points may occur. In some maps, there are clusters that are far apart. The improved method maintains relative positioning of points within clusters on the map while also reducing regions of empty space between clusters. The method enables a reduced scaling of points within the clusters while still fitting the clusters on the map.

In one example, the method cycles through the positions of all points in a matrix to determine a width and height of a map space being analyzed. The determined width and height are used to calculate an appropriate number of rows and columns for a grid which is proportional to a desired grid resolution.

Each point is mapped to a row and column within the grid. This mapping results in an intermediate representation of a point that is said to be snapped to grid position. An offset of how far each respective point actually is from the grid snapped position is stored for later use in restoring relative positions of points within each cluster.

A condensed matrix is generated by cycling through the rows and columns of the original matrix. If there are more than a user defined number of empty lines of consecutive empty rows or columns, subsequent consecutive empty lines are designated to be removed. If the matrix is densely populated, there will be no lines removed, but, if the matrix is sparsely populated and there are large regions of empty lines, many of the empty lines may be detected and removed. In one example, a grid resolution and threshold number of empty lines may be picked in a complimentary manner such that there are not over the threshold number of empty lines between points in the average cluster.

After removing empty lines, the result is a set of points on a condensed matrix. An original relative positioning of points within clusters may be restored by re-adding the offset of how far the point is from the grid snapped position.

FIG. 1A is an example representation of a matrix 100 to be condensed. Matrix 100 includes multiple points indicated as circles such as indicated at points 110, 111, 112, 113, 114, 115, 116, 117, 118, 119, 120, 121, 122, 123, 124, 125, 126, 127, and 128. Points 110, 111, 112, and 113 form a first cluster, 130. Points 114, 115, 116, 117, 118, 119, 120, 121, 122, and 123 form a second cluster 135. Points 124, 125, 126, 127, 128 and 129 form a third cluster 140. The clusters 130, 135, and 140 are laterally spaced from each other by a distance that is significantly larger than the circles representing the points.

Figure 1B:
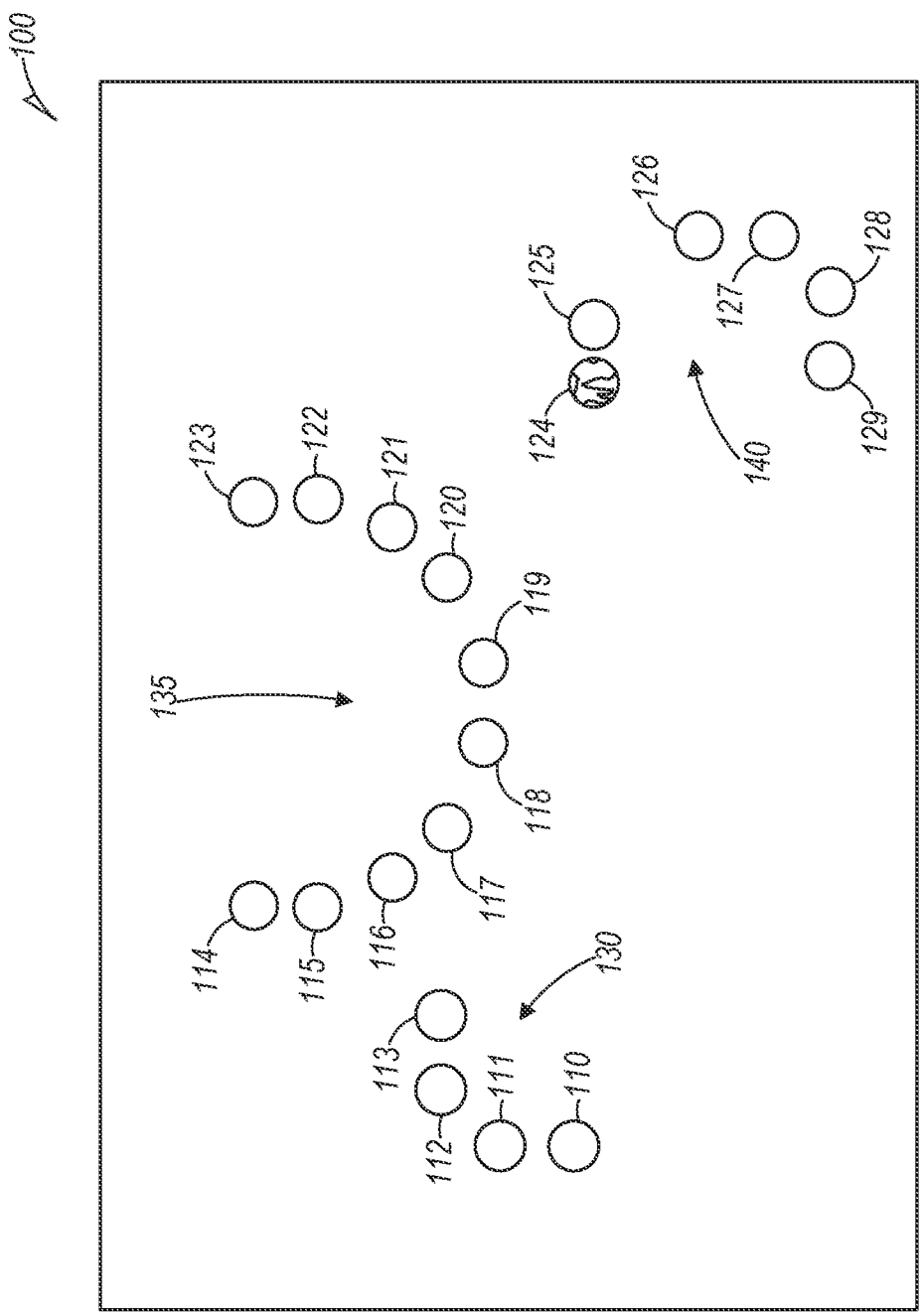
FIG. 1B is an example representation of the matrix of FIG. 1A following application of an improved matrix compression method according to an example embodiment.

FIG. 1B is an example representation 150 of the matrix 100 following application of the improved matrix compression method. The clusters 130, 135, and 140 are closer together laterally, yet the relative spacing of the points within each cluster is the same as in FIG. 1A. In one example, the relative spacing may be the same, but the circles representing the points may be larger. This can be helpful when the circles represent user interface elements on display.

The display size is the same in both FIGS. 1A and 1B, but the reduction in space between clusters enables the same number of points or circles to be displayed, yet also enables a larger representation of the user interface elements corresponding to the points. The larger representation enables users to more easily interact with links or functions corresponding to the user interface elements. Icons within the circles are more visible to users, further increasing usability.

The improved matrix compression method enables easier user interface generation without a programmer having to manually rearrange and place each user interface element, such as icons, on a display screen. Icons will remain grouped with the relative positioning of the icons within clusters maintained. Space between groups of icons will be removed providing a more compact user interface without adversely affecting usability.

In further examples, the points may be representative of virtual rooms in a virtual space, or seats in a virtual room which are perhaps positioned around tables. The seats at each table may constitute clusters of points. The points may correspond to icons with links to information associated with each seat, such as a person the seat is reserved for. Other objects in a room may also be represented by points that form one or more clusters. Many other objects in a room or environment, such as birds forming one or more clusters while flying may be represented as points that form clusters in further examples.

Figure 2A:
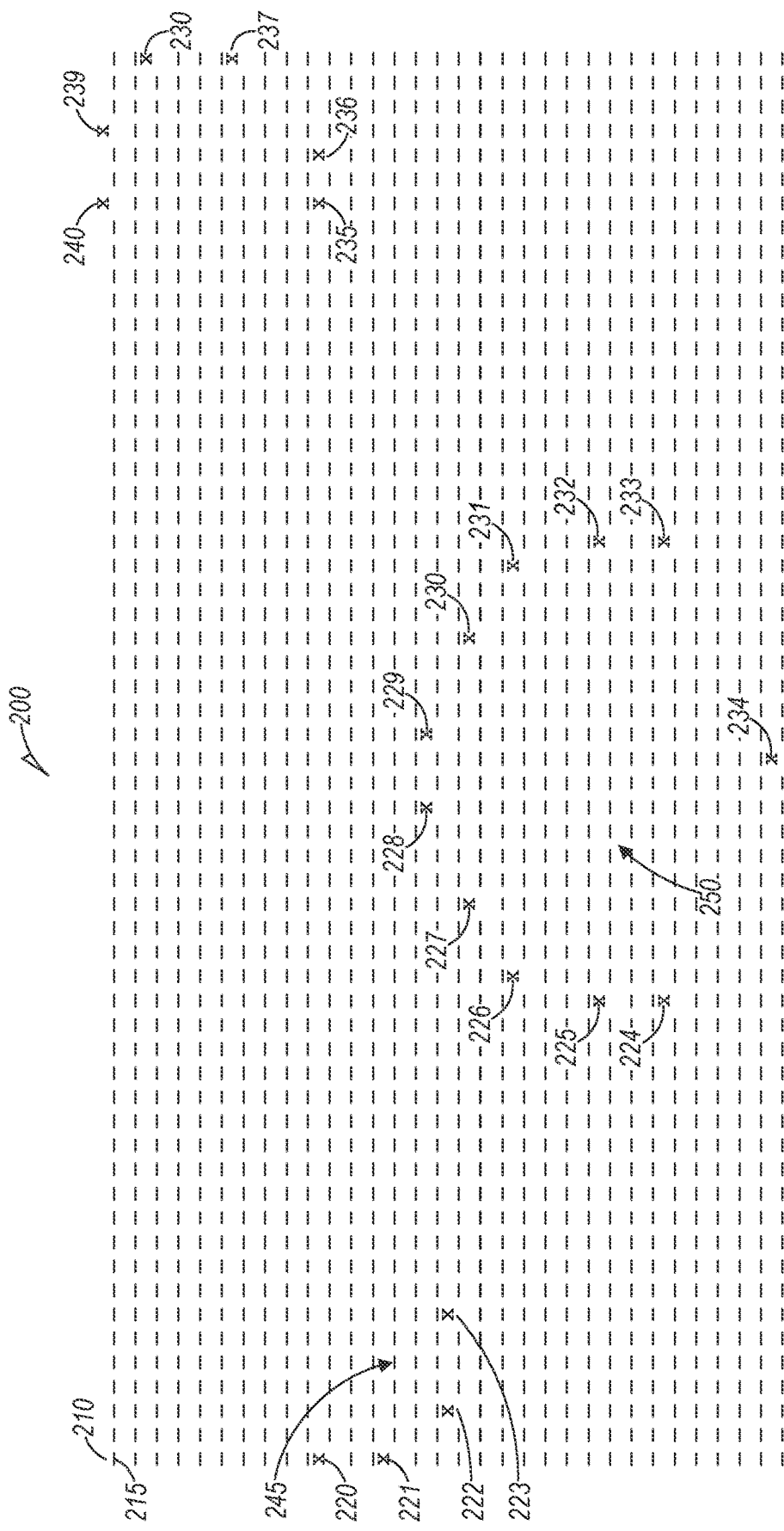
FIG. 2A is an example grid for three clusters of points according to an example embodiment.

FIG. 2A is an example grid 200 for three clusters of points. Grid 200 may include rows and columns in a two-dimensional representation. A three-dimensional grid with rows, columns, and a third dimension, such as height may also be used. The grid 200 is represented by an array of underline characters 215 that delineate cells. One such cell is shown at 210 representing the first cell in the array. Grid 200 is a two-dimensional array having rows and columns represented by the underline characters 215.

Each point is represented by an "X" such as at 220, 221, 222, 223, 224, 225, 226, 227, 228, 229, 230, 231, 232, 233, 234, 235, 236, 237, 238, 239, and 240. Points 220, 221, 222, and 223 are part of cluster 245. Points 224, 225, 226, 227, 228, 229, 230, 231, 232, 233, and 234 are part of cluster 250. Points 235, 236, 237, 238, 239, and 240 are part of cluster 255. Any clustering algorithm may be used to identify clusters, such as manual, density based, distribution based, hierarchical based, K-means clustering, Gaussian Mixture Model, or others.

As illustrated, the grid cell size has been selected such that there are about two or three rows or columns between points in the grid. This resolution of grid is helpful for later removal of rows or columns or both. A smaller cell size will work but can result in increased processing requirements to compress the matrix. A larger cell size can lead to less efficient resulting compression. For example, given alternative cell sizes of 1.0 in width and height versus 0.5 in width or height, one row or column might be removed between two clusters using 1.0-dimension cells, versus 3 rows or columns being removed between the same two cluster using 0.5 dimension cells. The 0.5-dimension cell grid leads to compression of the cluster distance 50% more than the 1.0 dimension cell grid compression.

Identification of empty rows and columns may be done in parallel or in any order. Such identification may be performed by identifying cells without values signifying points. In one example, point 223 is the right most point in cluster 245 and points 224 and 225 are the left most points in cluster 250. There are 12 empty columns between points 223 and 224 or 225. It is straight forward to identify a row or a column, or even a line in a third or more dimensions, such as time varying data by simply noting lines of cells that do not contain a point.

Figure 2B:
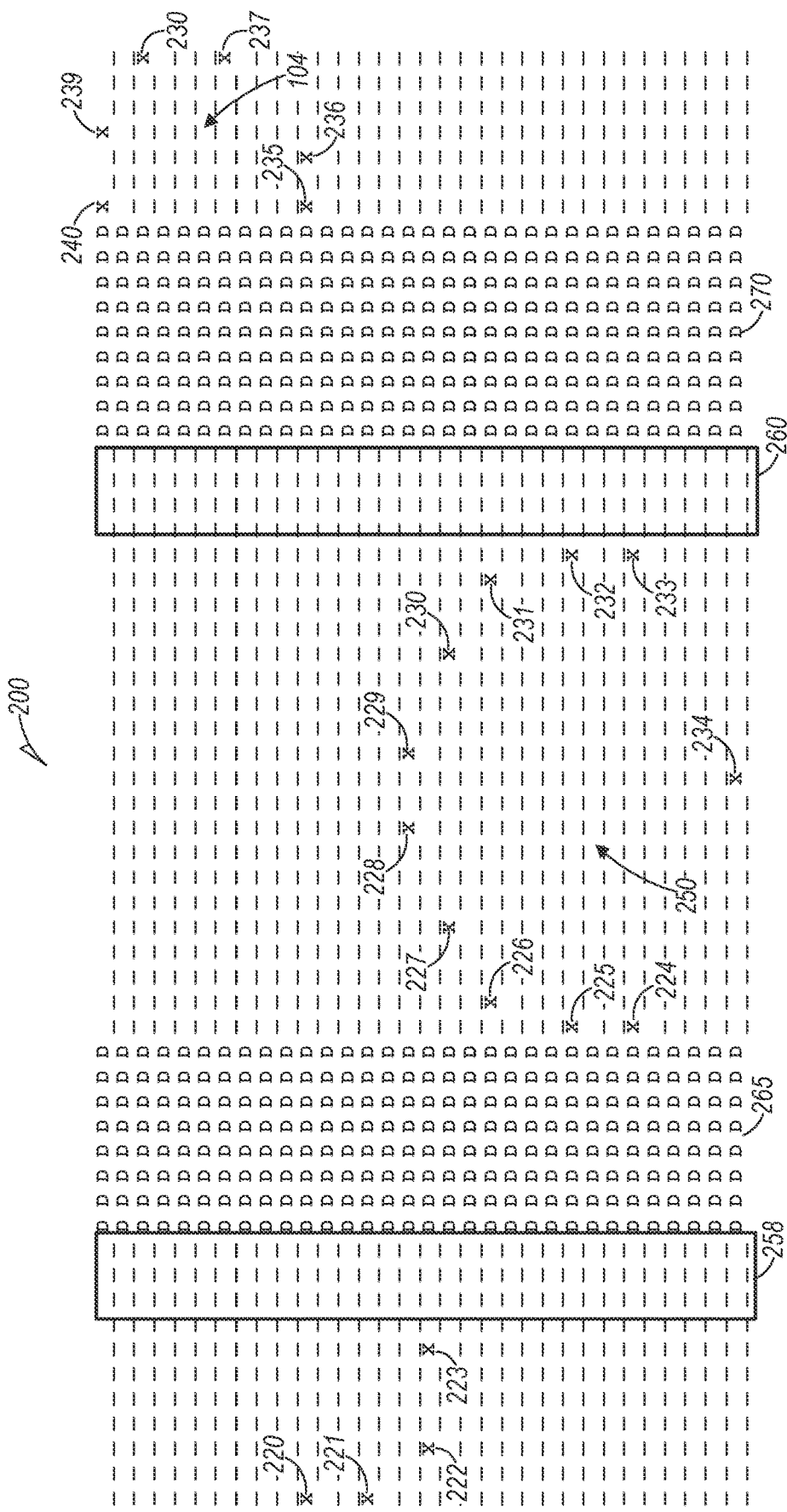
FIG. 2B is an illustration of grid showing lines, in this case, columns, to be removed utilizing the improved matrix compression method having a threshold number of empty columns set to four according to an example embodiment.

FIG. 2B is an illustration of grid 200 showing lines, in this case, columns, to be removed utilizing the improved matrix compression method having a threshold number of empty columns set to four. The points are still represented by "X's" in the same positions. Boxes 258 and 260 represent the threshold of 4 columns between clusters 245 and 250, and 250 and 255 respectively, which a void of points. Also illustrated with the letter "D" in each cell, are additional columns without points generally at 265 and 270 respectively. At 265, eight columns contain "D's" and at 270 nine columns contain "D's." A threshold of three would result in nine and ten columns being removed and a threshold of two would result in ten and eleven columns being removed.

Figure 2C:
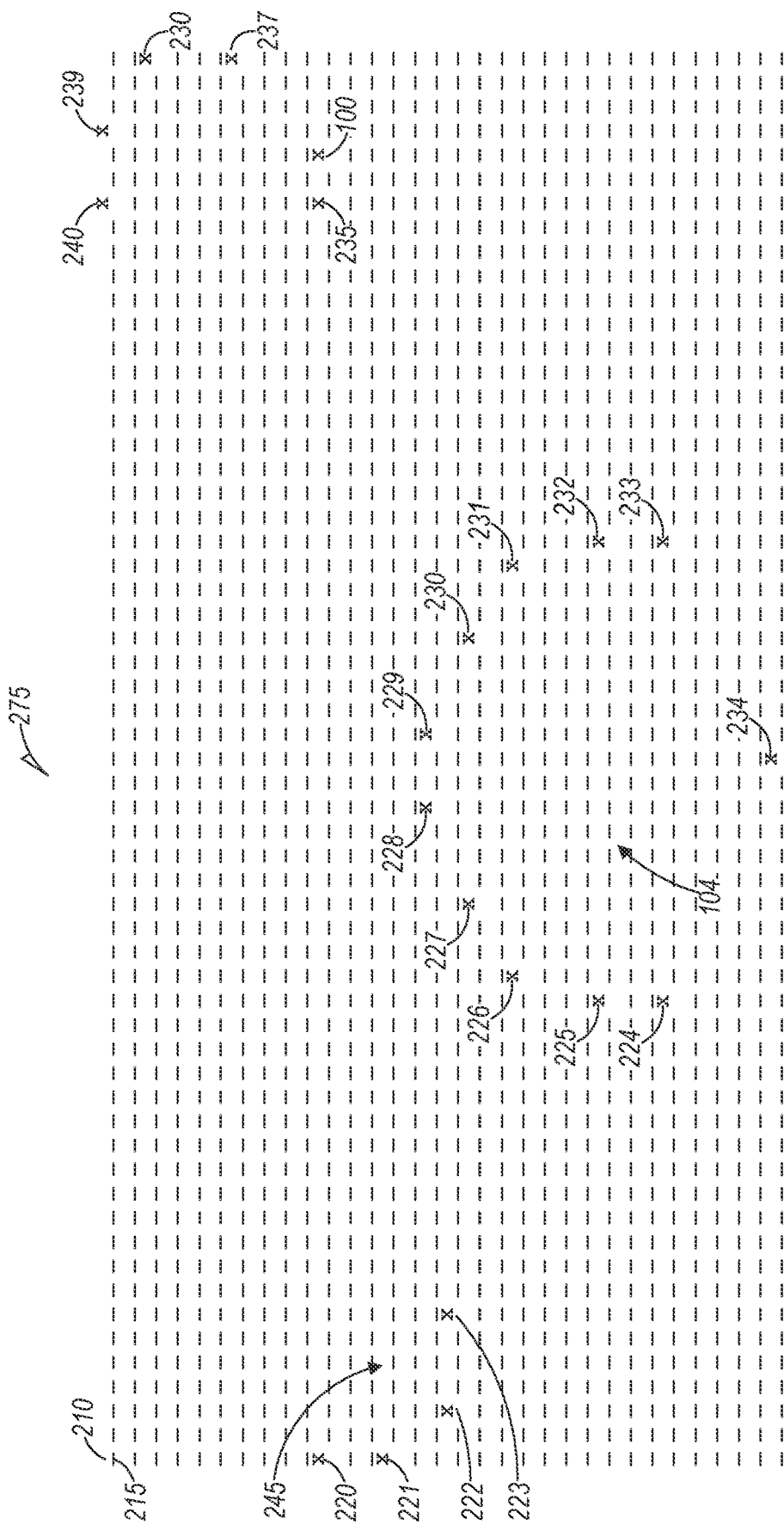
FIG. 2C is an example of a compressed grid having had the additional columns removed according to an example embodiment.

FIG. 2C is an example of a compressed grid 275 having had the additional columns at 265 and 270 removed. The resulting grid 275 is laterally compressed, without having compressed lateral space between individual points within any of the cluster. In a similar manner, rows may be removed using the same method with the same threshold number for empty rows utilized. The Threshold may vary between 1 and 5 or more in various examples. The threshold may vary as a function of the selected cell size in further examples such that grids having a fine resolution or small cell size compared to the spacing of clusters may have higher empty line threshold values. In one example, rows and columns falling outside the outside points of the clusters may be removed to optimize display space. The initial formation of the grid may include removal of such rows and columns in one example.

Figure 3A:
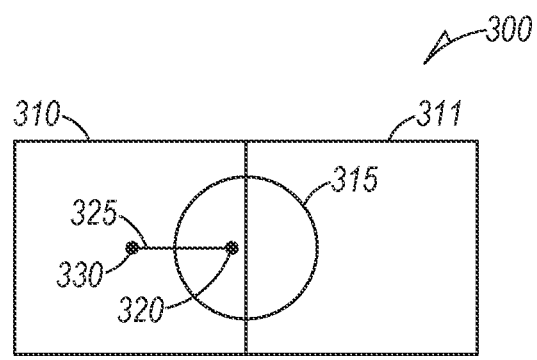
FIG. 3A is block diagram illustrating assigning of points to cells in a grid according to an example embodiment.

FIG. 3A is block diagram illustrating at 300, assigning points to cells in a grid. Two cells 310 and 311 of a grid are illustrated. A point 315, represented by a circle, is shown overlapping both cells 310 and 311. A center 320 of the point 315 resides in cell 310 and is a distance D, indicated by line 325, from a center 330 of cell 310. D may be a vector in some examples with x, y, z, and sometimes further components in matrices having more than two dimensions. In one example, based on a shortest distance between the center 320 and the centers of nearby cells, the point 315 will be assigned to cell 310. An offset corresponding to the distance D is stored and associated with the point. In one example, points are assigned to unique cells, each having corresponding offsets. In further examples, more than one point may be assigned to a same cell, with each point having a corresponding saved offset. The process of assigning points to cells may be referred to as snapping points to cells.

Figure 3B:
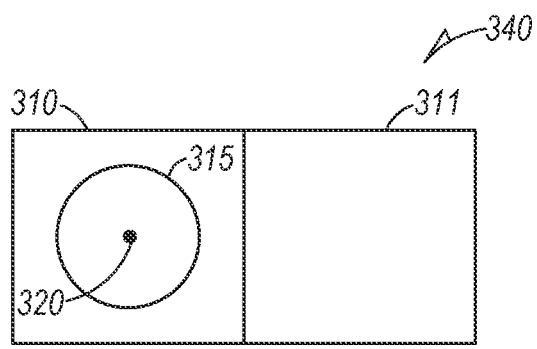
FIG. 3B is a block diagram illustrating cells with a point assigned to the cell according to an example embodiment.

FIG. 3B is a block diagram illustrating at 340, cells 310 and 311, with the point 315 assigned to the cell. The cell will reside at the intersection of a row and a column in a corresponding grid or array of cells. Once empty lines from the grid are removed, the points within each cluster may be snapped back into their correct relative positions by applying the corresponding offset to each point to move them back in their correct positions. Following snapping back of points, the clusters may be magnified or effectively zoomed in to provide a better view of the points within each cluster while still maintaining relative spacing of points in each cluster as well as preserving the ability to visually distinguish clusters as shown in FIG. 1B.

Figures 4, 5:
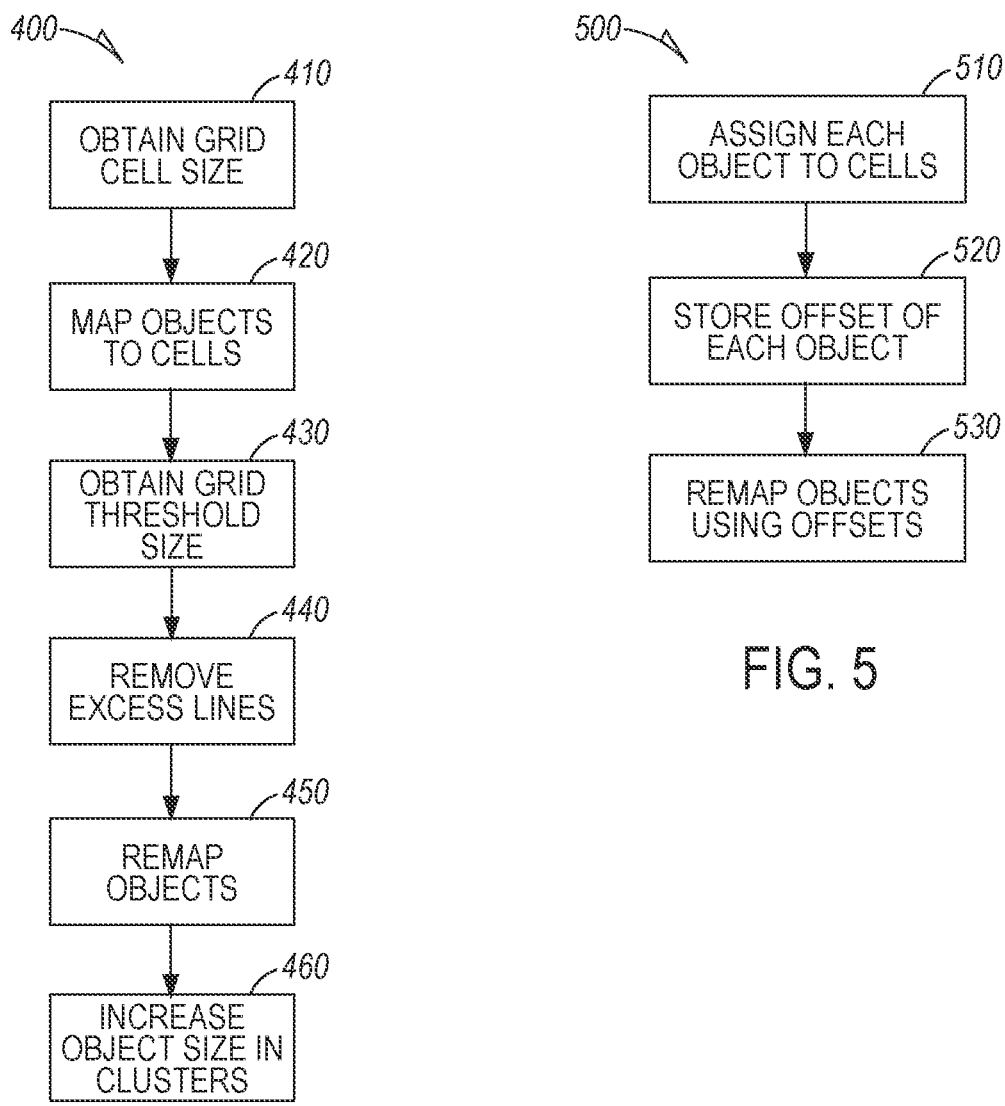
FIG. 4 is a flowchart illustrating a computer implemented method of compressing matrices of points forming clusters according to an example embodiment.
FIG. 5 is a flowchart illustrating a computer implemented method of mapping the objects to cells in the grid according to an example embodiment.

FIG. 4 is a flowchart illustrating a computer implemented method 400 of compressing matrices of points forming clusters. Method 400 begins at operation 410 by obtaining a grid cell size for multiple clusters of objects or points in a display space. The grid cell size may be selected as a function of a size of the objects. The objects may be user interface objects that include information such as a selectable link to further information. The objects may be user selectable icons in some examples. In a further example the objects may represent rooms in a space.

The objects or points are mapped at operation 420 to cells in the grid having the grid size. At operation 430, a grid compression threshold value expressed as a number of cells is obtained. The grid compression threshold value may be selected as a function of average space between clusters.

The grid is condensed at operation 440 by removing cells based on the grid compression threshold value. The objects are remapped in the display space at operation 450 such that space between clusters of object is reduced while maintaining relative positioning of objects within the clusters.

In one example, operation 460 increases the size of the remapped objects and the spacing of the objects within each cluster. This provides a zoomed in view of objects in each cluster while still maintaining relative spacing between the objects within each cluster. The display space, grid, and cells may have three or more dimensions with the objects are distributed within the three dimensions.

FIG. 5 is a flowchart illustrating a computer implemented method 500 of mapping the objects to cells in the grid. Method 500 cycles through each point or object at operation 510 and assigns each object to a respective cell in the grid. At operation 520, a corresponding offset to an initial position of each object is stored. The offset is used at operation 530 during remapping of the objects in the display space to restore the objects to their original positions within each cluster.

Figure 6:
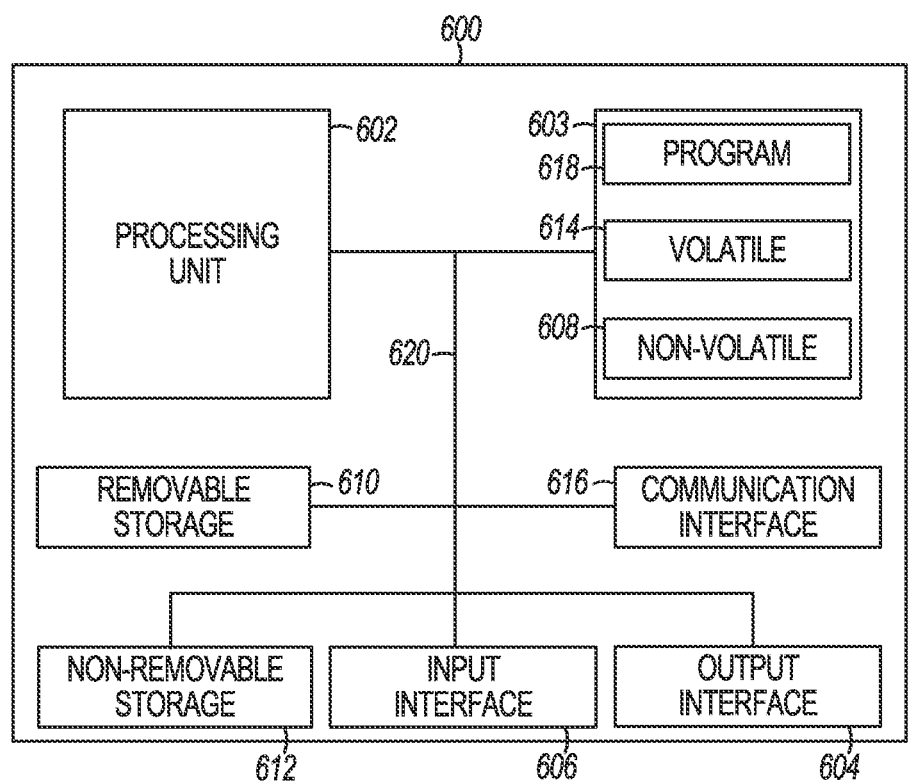
FIG. 6 is a block schematic diagram of a computer system to implement one or more example embodiments.

FIG. 6 is a block schematic diagram of a computer system 600 to perform a method of matrix compressive while preserving relative positions of points within clusters and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes obtaining a grid cell size for multiple clusters of objects in a display space. The objects are mapped to cells in the grid having the grid cell size. A grid compression threshold value expressed as a number of cells is used to condense the grid by removing cells based on the grid compression threshold value. The objects are remapped in the display space such that space between clusters of objects is reduced while maintaining relative positioning of objects within the clusters.
2. The method of example 1 and further including increasing a size of the remapped objects and the spacing of the objects within each cluster.
3. The method of any of examples 1-2 wherein mapping the objects to cells in the grid comprises assigning each object to a respective cell in the grid and storing a corresponding offset to an initial position of each object.
4. The method of example 3 wherein remapping the objects in the display space comprises restoring the objects to their original positions based on the corresponding offsets.

5. The method of any of examples 1-4 wherein the grid cell size is selected as a function of a size of the objects.
6. The method of any of examples 1-5 wherein the grid compression threshold value is selected as a function of average space between clusters.
7 The method of any of examples 1-6 wherein the objects are user interface objects that include information.
8. The method of example 7 wherein the objects include a selectable link to further information.
9. The method of example 7 wherein the objects are icons.
10. The method of any of examples 1-9 wherein the display space, grid, and cells have three dimensions and the objects are distributed within the three dimensions.
11. The method of any of examples 1-10 wherein the objects represent rooms in a space.
12. A machine-readable storage device has instructions for execution by a processor of a machine to cause the processor to perform operations to perform any of methods 1-11.
13. A device includes a processor and a memory device coupled to the processor and having a program stored thereon for execution by the processor to perform operations to perform operations to perform any of methods 1-11.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining a grid cell size for representing positions of multiple clusters of objects in a display space each cluster having an original spacing of objects within the cluster;
mapping the positions of the objects to cells in the grid having the grid cell size;
obtaining a grid compression threshold value as a function of cluster spacing and expressed as a number of cells;
condensing the grid by removing cells between clusters based on the grid compression threshold value; and
remapping the positions of the objects in the display space such that space between clusters of objects is reduced while maintaining relative original spacing of objects within the clusters.

2. The method of claim 1 and further comprising increasing a size of the remapped objects and the spacing of the objects within each cluster.

3. The method of claim 1 wherein mapping the positions of objects to cells in the grid comprises assigning each object to a respective cell in the grid and storing a corresponding offset to an initial position of each object.

4. The method of claim 3 wherein remapping the positions of objects in the display space comprises restoring the objects to their original positions based on the corresponding offsets.

5. The method of claim 1 wherein the grid cell size is selected as a function of a size of the objects.

6. The method of claim 1 wherein the grid compression threshold value is selected as a function of average space between clusters.

7. The method of claim 1 wherein the objects are user interface objects that include information.

8. The method of claim 7 wherein the objects include a selectable link to further information.

9. The method of claim 7 wherein the objects are icons.

10. The method of claim 1 wherein the display space, grid, and cells have three dimensions and the objects are distributed within the three dimensions.

11. The method of claim 1 wherein the objects represent virtual rooms in a virtual space.

12. A machine-readable storage device having instructions for execution by a processor of a machine to cause the processor to perform operations to perform a method, the operations comprising:
- obtaining a grid cell size for representing positions of multiple clusters of objects in a display space each cluster having an original spacing of objects within the cluster;
- mapping the positions of the objects to cells in the grid having the grid cell size;
- obtaining a grid compression threshold value as a function of cluster spacing and expressed as a number of cells;
- condensing the grid by removing cells between clusters based on the grid compression threshold value; and
- remapping the positions of the objects in the display space such that space between clusters of objects is reduced while maintaining relative original spacing of objects within the clusters.

13. The device of claim 12 wherein the operations further comprise increasing a size of the remapped objects and the spacing of the objects within each cluster.

14. The device of claim 12 wherein mapping the positions of objects to cells in the grid comprises assigning each object to a respective cell in the grid and storing a corresponding offset to an initial position of each object.

15. The device of claim 14 wherein remapping the objects in the display space comprises restoring the objects to their original positions based on the corresponding offsets.

16. The device of claim 12 wherein the grid cell size is selected as a function of a size of the objects and wherein the grid compression threshold value is selected as a function of average space between clusters.

17. The device of claim 12 wherein the objects are icons having selectable links to further information.

18. The device of claim 12 wherein the display space, grid, and cells have three dimensions and the objects are distributed within the three dimensions.

19. A device comprising:
- a processor; and
- a memory device coupled to the processor and having a program stored thereon for execution by the processor to perform operations comprising:
  - obtaining a grid cell size for representing positions of multiple clusters of objects in a display space each cluster having an original spacing of objects within the cluster;
  - mapping the positions of the objects to cells in the grid having the grid cell size;
  - obtaining a grid compression threshold value as a function of cluster spacing and expressed as a number of cells;
  - condensing the grid by removing cells between clusters based on the grid compression threshold value; and
  - remapping the positions of the objects in the display space such that space between clusters of objects is reduced while maintaining relative original spacing of objects within the clusters.

20. The device of claim 19 wherein the operations further comprise increasing a size of the remapped objects and the spacing of the objects within each cluster and wherein mapping the objects to cells in the grid comprises assigning each object to a respective cell in the grid and storing a corresponding offset to an initial position of each object, and wherein remapping the objects in the display space comprises restoring the objects to their original positions based on the corresponding offsets.

* * * * *